(12) United States Patent
Tabata

(10) Patent No.: US 11,495,066 B2
(45) Date of Patent: Nov. 8, 2022

(54) RECORDING DEVICE FOR VEHICLES, RECORDING METHOD FOR VEHICLES, AND A NON-TRANSITORY COMPUTER READABLE MEDIUM

(71) Applicant: JVCKENWOOD CORPORATION, Yokohama (JP)

(72) Inventor: Kiyofumi Tabata, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 291 days.

(21) Appl. No.: 16/860,350

(22) Filed: Apr. 28, 2020

(65) Prior Publication Data

US 2020/0258329 A1 Aug. 13, 2020

Related U.S. Application Data

(63) Continuation of application No. PCT/JP2018/040674, filed on Nov. 1, 2018.

(30) Foreign Application Priority Data

Feb. 26, 2018 (JP) .............................. JP2018-031811

(51) Int. Cl.
*G07C 5/08* (2006.01)
*G10L 21/0208* (2013.01)
*G06V 20/56* (2022.01)

(52) U.S. Cl.
CPC ........... *G07C 5/0866* (2013.01); *G06V 20/56* (2022.01); *G10L 21/0208* (2013.01); *G10L 2021/02085* (2013.01)

(58) Field of Classification Search
CPC ...................................................... G06V 20/56
See application file for complete search history.

(56) References Cited

U.S. PATENT DOCUMENTS

| 6,940,397 B1 * | 9/2005 | Le Mire | B60R 25/302 |
| | | | 348/148 |
| 9,592,795 B1 * | 3/2017 | Whiteside | G01S 19/13 |
| 10,284,317 B1 * | 5/2019 | Sanchez | G08G 1/0965 |

(Continued)

FOREIGN PATENT DOCUMENTS

| JP | 2017-059086 A | 3/2017 |
| JP | 2017-134646 A | 8/2017 |
| KR | 10-1655751 B1 | 9/2016 |

*Primary Examiner* — Shaun Roberts
(74) *Attorney, Agent, or Firm* — Procopio, Cory, Hargreaves & Savitch LLP

(57) ABSTRACT

An event data recorder as a recording device for vehicles capable of recording clear sound data that may contribute to investigation of a cause of an accident in event recording data, regardless of a sound volume of an audio sound played back in the own vehicle, includes a video data acquisition unit configured to acquire video data including sound data and imaging an area around the own vehicle, a sound volume detection unit configured to detect a sound volume of an audio sound played back in the vehicle, and a recording control unit configured to record video data including data by which a sound volume of an audio sound can be determined and sound data on which an effect of an audio sound is small, when a sound volume of an audio sound detected by the sound volume detection unit is greater than a sound volume.

8 Claims, 5 Drawing Sheets

(56) References Cited

U.S. PATENT DOCUMENTS

| | | | |
|---|---|---|---|
| 10,878,646 B2* | 12/2020 | Plante | G07C 5/085 |
| 2002/0035422 A1 | 3/2002 | Sasaki | |
| 2002/0102961 A1* | 8/2002 | Gibbons | G08G 1/0965 |
| | | | 455/70 |
| 2007/0067079 A1 | 3/2007 | Kosugi | |
| 2008/0316314 A1* | 12/2008 | Bedell | H04N 5/77 |
| | | | 348/148 |
| 2010/0112945 A1* | 5/2010 | Hanif | H04L 12/2816 |
| | | | 700/12 |
| 2010/0182398 A1* | 7/2010 | Mazzilli | B60R 1/12 |
| | | | 348/E7.001 |
| 2010/0245583 A1* | 9/2010 | Harel | G08B 13/19656 |
| | | | 348/E7.001 |
| 2012/0230504 A1* | 9/2012 | Kuroda | G10K 11/17837 |
| | | | 381/71.4 |
| 2014/0300739 A1* | 10/2014 | Mimar | G06Q 40/08 |
| | | | 348/148 |
| 2014/0347440 A1* | 11/2014 | Hatcher | H04N 5/2252 |
| | | | 348/36 |
| 2014/0348484 A1* | 11/2014 | Erwin | A42B 3/042 |
| | | | 386/223 |
| 2016/0029111 A1* | 1/2016 | Wacquant | H04R 3/005 |
| | | | 381/86 |
| 2016/0167479 A1* | 6/2016 | Morin | B60H 1/00742 |
| | | | 701/48 |
| 2017/0026764 A1* | 1/2017 | Rajendran | H03G 3/32 |
| 2017/0034430 A1* | 2/2017 | Fu | H04N 5/23203 |
| 2017/0365007 A1* | 12/2017 | Huls | G07C 5/008 |
| 2018/0154908 A1* | 6/2018 | Chen | G07C 5/008 |
| 2018/0211648 A1 | 7/2018 | Nagai | |

* cited by examiner

RECORDING DEVICE FOR VEHICLES, RECORDING METHOD FOR VEHICLES, AND A NON-TRANSITORY COMPUTER READABLE MEDIUM

CROSS REFERENCE TO RELATED APPLICATION

This application is a Bypass Continuation of PCT/JP2018/040674, filed on Nov. 1, 2018 which is based upon and claims the benefit of priority from Japanese patent application No. 2018-031811, filed on Feb. 26, 2018, the disclosure of which is incorporated herein in its entirety by reference.

BACKGROUND

The present invention relates to a recording device for vehicles, a recording method for vehicles, and a program.

Event data recorders as recording devices for vehicles have become widespread in recent years. An event data recorder records video data in a predetermined period before and after occurrence of an event (detection of acceleration due to an accident or the like) as event recording data. Japanese patent application No. 2017-134646 discloses an event data recorder removing music from sound data included in video data, on the basis of music data acquired from an audio device, and recording the resulting data.

SUMMARY

An accident detected as an event may be caused by difficulty in recognition of sound around a vehicle due to a high sound volume of an audio sound. For example, the above may occur when a sound volume of an audio sound is so high that a sound of a motorcycle existing in a blind spot of a vehicle is not heard, when a horn sound of a vehicle in a surrounding area is not heard, when a siren sound of an emergency vehicle is not heard, or when attention to driving is distracted due to paying attention to an audio sound at a high sound volume.

When an audio sound at a high sound volume is recorded as-is in an accident record, a sound around a vehicle, a sound inside a vehicle cabin, or the like may be unclear or may be drowned out by the audio sound. In such a case, a sound volume at which the audio was played back at the time of the accident may not be found even by use of event recording data acquired by canceling the audio sound at a high sound volume, as is the case with Japanese patent application No. 2017-134646, and a cause of the accident may not be properly investigated.

The present embodiment has been made in view of the background described above, and an object thereof is to provide a recording device for vehicles capable of recording clear sound data that may contribute to investigation of a cause of an accident into event recording data, regardless of a sound volume of an audio sound played back in the own vehicle.

The present embodiment is a recording device for vehicles including a video data acquisition unit configured to acquire video data including sound data and imaging an area around the own vehicle, a sound volume detection unit configured to detect a sound volume of an audio sound played back in the own vehicle, and a recording control unit configured to record video data including data by which a sound volume of an audio sound can be determined and sound data on which an effect of an audio sound is small, when a sound volume of an audio sound detected by the sound volume detection unit is greater than a predetermined sound volume.

The present embodiment is a recording method for vehicles including a first step of acquiring video data including sound data and imaging an area around the own vehicle, a second step of detecting a sound volume of an audio sound played back in the own vehicle, and a third step of recording video data including data by which a sound volume of an audio sound can be determined and sound data on which an effect of an audio sound is small, when a detected sound volume of an audio sound is greater than a predetermined sound volume.

The present embodiment is a program for causing a computer to execute a processing procedure for recording for vehicles, the program including a first processing procedure of acquiring video data including sound data and imaging an area around the own vehicle, a second processing procedure of detecting a sound volume of an audio sound played back in the own vehicle, and a third processing procedure of recording video data including data by which a sound volume of an audio sound can be determined and sound data on which an effect of an audio sound is small, when a detected sound volume of an audio sound is greater than a predetermined sound volume.

According to the present embodiment, clear sound data that may contribute to investigation of a cause of an accident can be recorded in event recording data, regardless of a sound volume of an audio sound played back in the own vehicle.

DETAILED DESCRIPTION

The present invention will be described below through embodiments of the present invention; however, the invention according to the claims is not limited to the following embodiments. Further, not every configuration described in the embodiments is necessarily essential to a means for solving the problem. For clarification of description, omission and simplification are made to the following descriptions and drawings as appropriate. In each drawing, the same components are given the same reference signs, and redundant description is omitted as necessary.

First Embodiment

Figure 1:
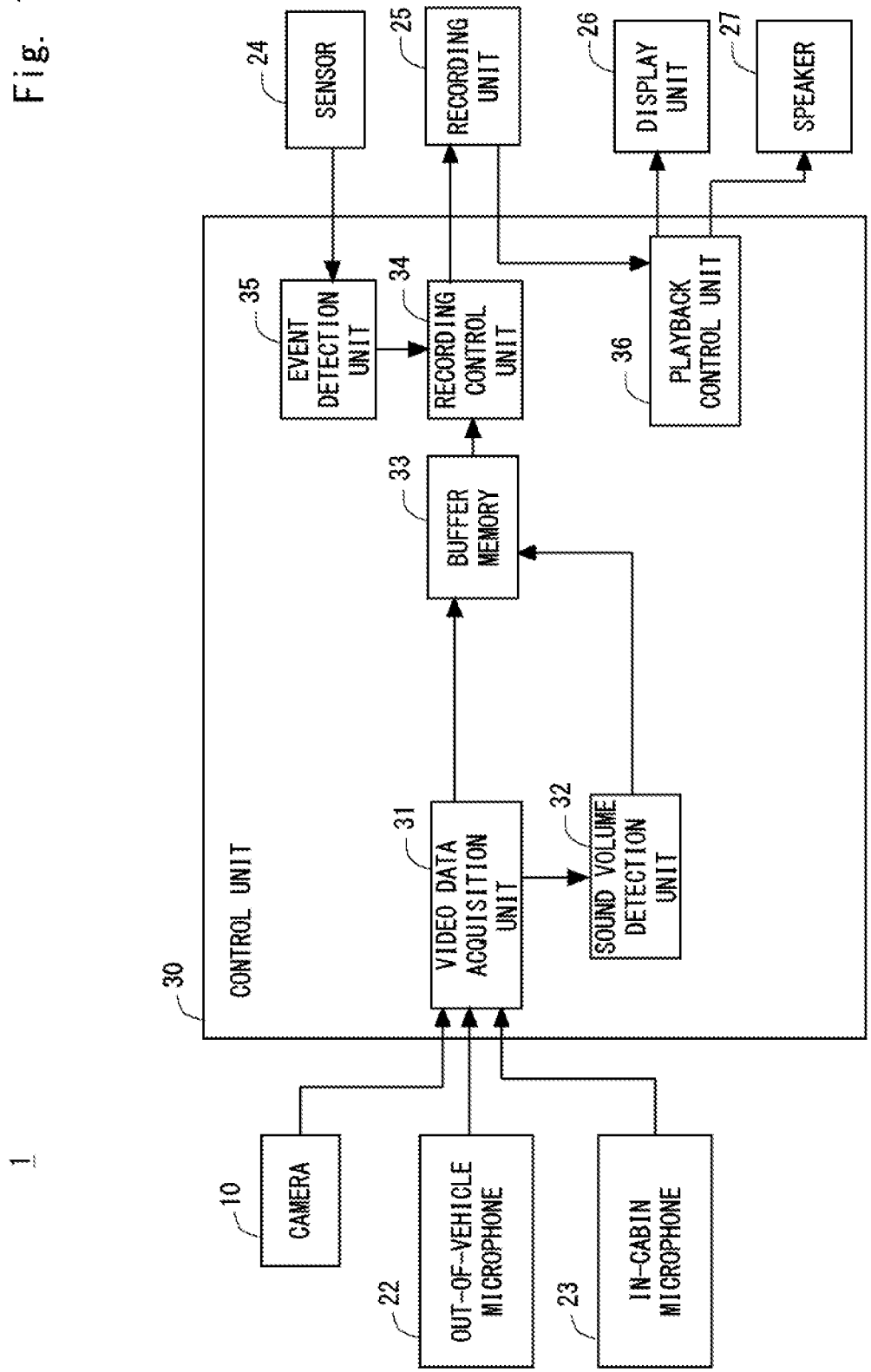
FIG. 1 is a block diagram illustrating a configuration of an event data recorder as a recording device for vehicles according to a first embodiment.

FIG. 1 is a block diagram illustrating a configuration of an event data recorder 1 as a recording device for vehicles according to a first embodiment. The event data recorder 1 is a device recording moving image data at least combining a video image around a vehicle and a sound inside a vehicle cabin. As illustrated in FIG. 1, the event data recorder 1 includes a camera 10, an out-of-cabin microphone 22, an in-cabin microphone 23, a sensor 24, a recording unit 25, a display unit 26, a speaker 27, and a control unit 30.

The camera 10 is for shooting an area around the own vehicle and mainly includes a lens, an imaging element, and an analog front end (AFE). Image data shot by the camera 10 are input to the control unit 30. The out-of-cabin microphone 22 is a device installed outside a vehicle cabin (for example, on a side view mirror) and collects a sound outside the vehicle cabin. The in-cabin microphone 23 is a device installed inside the vehicle cabin (for example, on a rearview mirror) and collects a sound inside the vehicle cabin. Sound data collected by the out-of-cabin microphone 22 and the in-cabin microphone 23 are input to the control unit 30.

The control unit 30 performs processing related to a recording operation of the event data recorder 1. A flow of the processing related to the recording operation of the event data recorder 1 will be described later. The control unit 30 is connected to the camera 10, the out-of-cabin microphone 22, and the in-cabin microphone 23 in a wired or wireless manner. The control unit 30 includes a video data acquisition unit 31, a sound volume detection unit 32, a buffer memory 33, a recording control unit 34, an event detection unit 35, and a playback control unit 36.

The video data acquisition unit 31 acquires video data including sound data and imaging an area around the own vehicle. The video data acquisition unit 31 acquires an image around the own vehicle shot by the camera 10. Further, for example, the video data acquisition unit 31 acquires sound data from the out-of-cabin microphone 22 and the in-cabin microphone 23. Video data acquired by the video data acquisition unit 31 are temporarily recorded in the buffer memory 33.

The sound volume detection unit 32 detects a sound volume of an audio sound played back in the own vehicle. For example, the sound volume detection unit 32 detects a sound volume of an audio sound played back in the own vehicle from a sound inside the vehicle cabin collected by the in-cabin microphone 23, the sound being acquired through the video data acquisition unit 31. The sound volume detection unit 32 may detect a sound volume of an audio sound by acquiring sound volume information and volume position information from an unillustrated audio device. A sound volume of an audio sound detected by the sound volume detection unit 32 is temporarily recorded in the buffer memory 33.

The recording control unit 34 controls processing of recording video data into the recording unit 25. Details of the processing will be described in the flow of the processing related to the recording operation of the event data recorder 1, to be described later.

The recording unit 25 is a memory for recording video data. For example, the recording unit 25 is a nonvolatile memory such as a flash memory. When the recording unit 25 is a detachable memory card, the event data recorder 1 needs to be provided with a connection interface for connecting to the memory card. The recording unit 25 may be another device recording video data through a communication line or the like.

The event detection unit 35 detects occurrence of a predetermined event with respect to the own vehicle. Specifically, the event detection unit 35 detects an event by detecting a shock or the like received by the own vehicle through the sensor 24 such as an acceleration sensor. More specifically, the event detection unit 35 acquires an acceleration signal from the sensor 24 and determines occurrence of an event related to the own vehicle, such as a collision, when the acceleration signal is greater than or equal to a preset threshold value or when a predetermined acceleration transition occurs. The sensor 24 may be built-into the event data recorder 1 or may be separate from the event data recorder 1.

When receiving an instruction to play back a specified video data recorded in the recording unit 25, the playback control unit 36 causes the display unit 26 being a display device for displaying a video image and the like to display an image of the video data and also outputs a sound of the video data through the speaker 27.

Next, the flow of the processing related to the recording operation of the event data recorder 1 will be described. In the following description, FIG. 1 is referred to as appropriate with regard to the configuration of the event data recorder 1.

Figure 2:
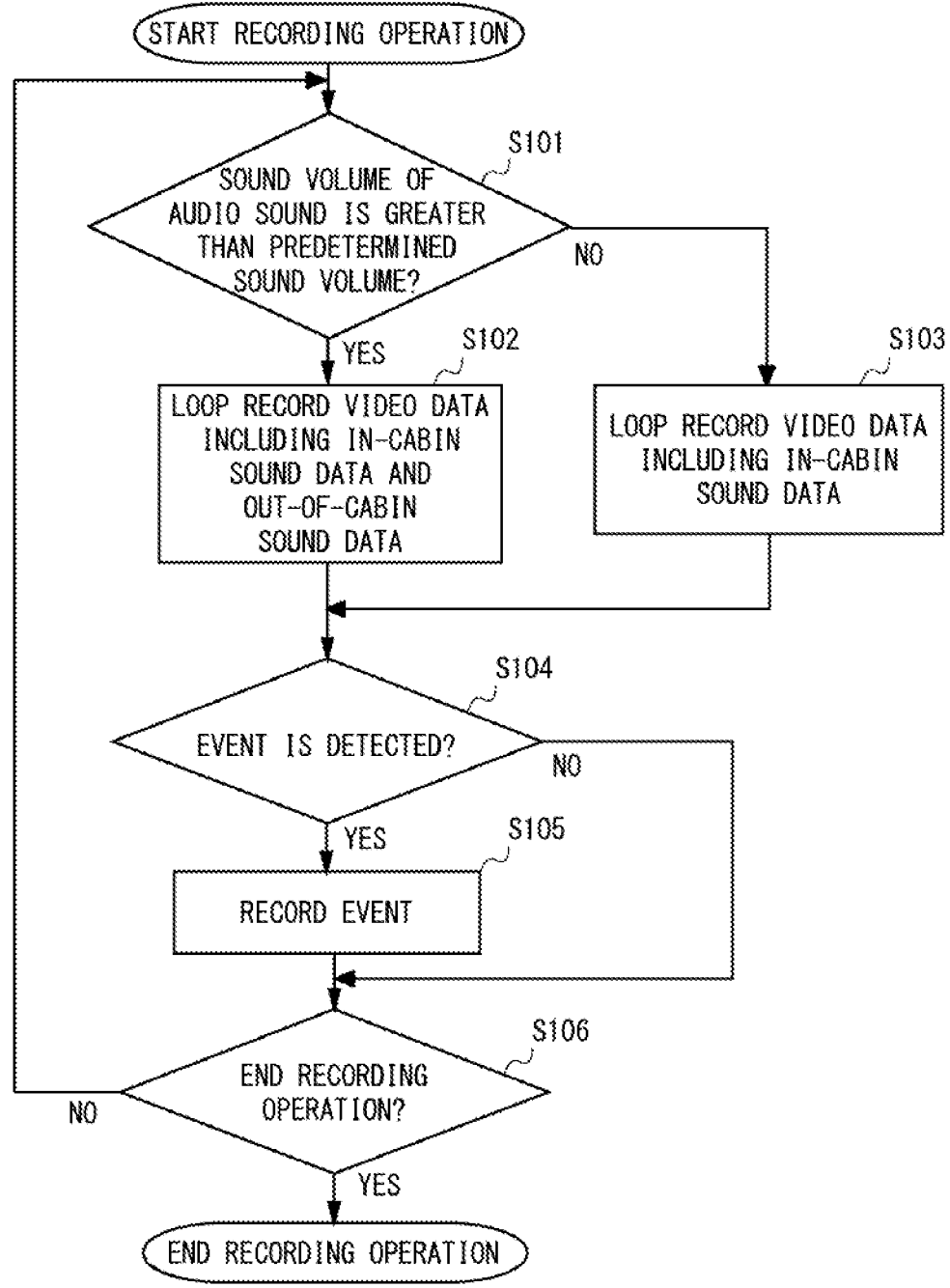
FIG. 2 is a flowchart illustrating an example of a flow of processing related to a recording operation of the event data recorder according to the first embodiment.

FIG. 2 is a flowchart illustrating an example of the flow of the processing related to the recording operation of the event data recorder 1. As illustrated in FIG. 2, first, whether or not a sound volume of an audio sound detected by the sound volume detection unit 32 is greater than a predetermined sound volume is determined in the recording control unit 34 (step S101). A sound volume of an audio sound by which in-cabin sound data is hindered for assessment of a situation of an event or the like is set as an example of the predetermined sound volume, and for example, when the sound volume at a position of the in-cabin microphone 23 is greater than or equal to 60 dB or 70 dB, the sound volume is determined to be greater than the predetermined sound volume.

When the sound volume of the audio sound is greater than the predetermined sound volume in step S101 (in the case of YES), the recording control unit 34 loop records video-sound data including in-cabin sound data and out-of-cabin sound data into the recording unit 25 (step S102). When the sound volume of the audio sound is less than or equal to the predetermined sound volume in step S101 (in the case of NO), the recording control unit 34 loop records video-sound data including in-cabin sound data (step S103). A loop record herein refers to a record overwritten after an elapse of a certain period of time. Specifically, in loop recording, when a recording capacity of a predetermined recording area in the recording unit 25 becomes full, update by overwriting older items is performed. In the case of loop recording, for example, the recording control unit 34 accesses the buffer memory 33 every 60 seconds, generates a data file, and records the data file into the recording unit 25.

Subsequently to step S102 or step S103, the recording control unit 34 determines whether or not the event detection unit 35 detects an event (step S104). When an event is determined to be detected in step S104 (in the case of YES), the recording control unit 34 records video data including data by which the sound volume of the audio sound can be determined and sound data on which an effect of the audio sound is small into the recording unit 25 as event recording data (step S105). When an event is not determined to be detected in step S104 (in the case of NO) the processing is advanced to step S106 to be described later.

For example, the data by which the sound volume of the audio sound can be determined are sound data inside a vehicle cabin of the own vehicle (in-cabin sound data), the sound data being collected by the in-cabin microphone 23. For example, the sound data on which an effect of the audio sound is small are sound data outside the vehicle cabin of the own vehicle (out-of-cabin sound data), the sound data being collected by the out-of-cabin microphone 22.

Further, the event recording data are video data that may be used for situation confirmation of an accident, preservation of evidence, and the like and are recorded differently from other video data. For example, event recording data may be recorded in the recording unit 25 as overwrite protected recording data. The recording control unit 34 may not record event recording data into the recording unit 25 and transmit the data to a predetermined recording device (for example, a server of an organization delivering event information) by use of a communication line.

Subsequently to step S105, whether or not there is an instruction to end the recording operation is determined (step S106). When there is an instruction to end the recording operation in step S106 (in the case of YES), the recording operation is ended. When there is no instruction to end the recording operation in step S106 (in the case of YES), the processing is returned to step S101. Ending the recording operation includes a case of ending use of the vehicle, and more specifically a case of turning power of an engine, a motor, or the like off.

As described above, when a sound volume of an audio sound is greater than a predetermined sound volume, the recording device for vehicles according to the present embodiment records video data including data by which a sound volume of the audio sound can be determined and sound data on which an effect of the audio sound is small, as event recording data. The data by which the sound volume of the audio sound can be determined are sound data inside a vehicle cabin of the own vehicle, and the sound data on which an effect of the audio sound is small are sound data outside the vehicle cabin of the own vehicle. In other words, when the sound volume of the audio sound is greater than the predetermined sound volume, the recording device for vehicles according to the present embodiment acquires sound data inside the vehicle cabin of the own vehicle and sound data outside the vehicle cabin of the own vehicle, respectively, and by use of the sound data, composes sound data in event recording data. Consequently, clear sound data that may contribute to investigation of a cause of an accident can be recorded in event recording data, regardless of a sound volume of an audio sound played back in the own vehicle.

Second Embodiment

Figure 3:
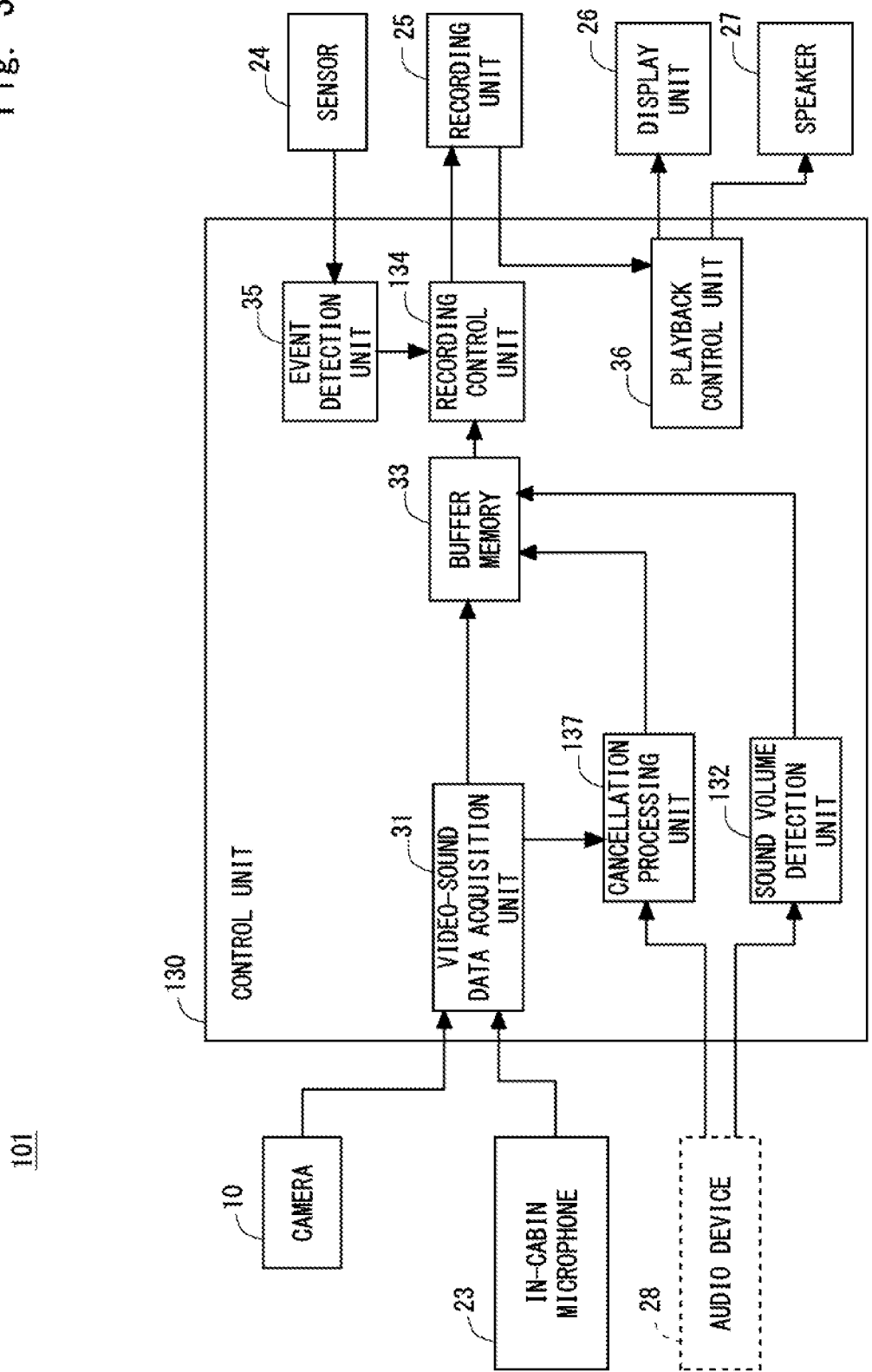
FIG. 3 is a block diagram illustrating a configuration of an event data recorder as a recording device for vehicles according to a second embodiment.

FIG. 3 is a block diagram illustrating a configuration of an event data recorder 101 as a recording device for vehicles according to a second embodiment. As illustrated in FIG. 3, the event data recorder 101 includes a camera 10, an in-cabin microphone 23, a sensor 24, a recording unit 25, a display unit 26, a speaker 27, and a control unit 130.

The control unit 130 performs processing related to a recording operation of the event data recorder 101. A flow of processing related to the recording operation of the event data recorder 101 will be described later. The control unit 130 is connected to the camera 10 and the in-cabin microphone 23 in a wired or wireless manner. Further, the control unit 130 is connected to an audio device 28 in a wired or wireless manner. The control unit 130 includes a video data acquisition unit 31, a sound volume detection unit 32, a buffer memory 33, a recording control unit 34, an event detection unit 35, a playback control unit 36, and a cancellation processing unit 37.

The sound volume detection unit 132 detects a sound volume of an audio sound played back in the own vehicle. For example, the sound volume detection unit 132 detects a sound volume of an audio sound played back in the own vehicle from an audio signal acquired from the audio device 28 outputting the audio sound. The sound volume detection unit 132 may detect a sound volume of an audio sound played back in the own vehicle from a sound inside a vehicle cabin collected by the in-cabin microphone 23, similarly to the first embodiment. A sound volume of an audio sound detected by the sound volume detection unit 132 is temporarily recorded in the buffer memory 33.

The cancellation processing unit 137 cancels an audio sound from sound data acquired inside the vehicle cabin of the own vehicle, on the basis of an audio signal acquired from the audio device 28 outputting the audio sound. Specifically, on the basis of the audio signal acquired from the audio device 28, the cancellation processing unit 137 performs cancellation processing of removing the audio sound from the sound data of the in-cabin microphone 23 by adding reverse-phase data of the audio signal to the sound data.

When the audio device 28 is a mobile terminal capable of playing back music, such as a smartphone, the control unit 130 acquires an audio signal through wireless communication.

The recording control unit 134 controls processing of recording video data into the recording unit 25. Details of the processing will be described in the flow of the processing related to the recording operation of the event data recorder 101, to be described later.

Next, the flow of processing related to the recording operation of the event data recorder 101 will be described. In the following description, FIG. 3 is referred to as appropriate with regard to the configuration of the event data recorder 101.

Figure 4:
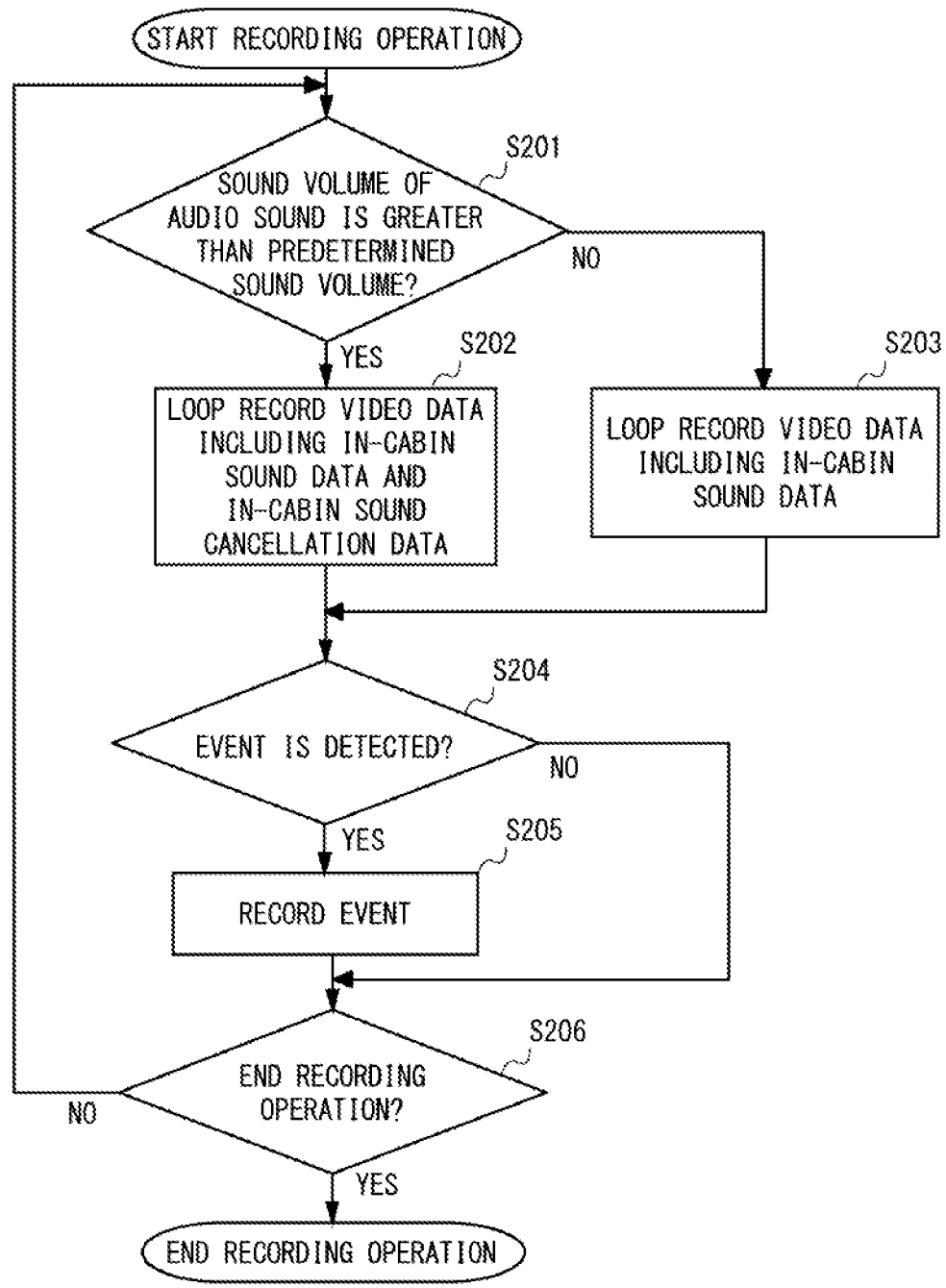
FIG. 4 is a flowchart illustrating an example of a flow of processing related to a recording operation of the event data recorder according to the second embodiment.

FIG. 4 is a flowchart illustrating an example of the processing flow related to the recording operation of the event data recorder 101. As illustrated in FIG. 4, first, whether or not a sound volume of an audio sound detected by the sound volume detection unit 132 is greater than a predetermined sound volume is determined in the recording control unit 134 (step S201).

When the sound volume of the audio sound is greater than the predetermined sound volume in step S201 (in the case of YES), the recording control unit 134 loop records video-sound data including in-cabin sound data and in-cabin sound cancellation data into the recording unit 25 (step S202). When the sound volume of the audio sound is less than or equal to the predetermined sound volume in step S201 (in the case of NO), the recording control unit 134 loop records video-sound data including in-cabin sound data (step S203).

Subsequently to step S202 or step S203, the recording control unit 134 determines whether or not the event detection unit 35 detects an event (step S204). When an event is determined to be detected in step S204 (in the case of YES), the recording control unit 134 records video data including data by which the sound volume of the audio sound can be determined and sound data on which an effect of the audio sound is small into the recording unit 25 as event recording data (step S205). When an event is not determined to be detected in step S204 (in the case of NO), the processing is advanced to step S206 to be described later.

For example, the data by which the sound volume of the audio sound can be determined are the in-cabin sound data acquired by the in-cabin microphone 23. For example, the sound data on which an effect of the audio sound is small are the in-cabin sound cancellation data acquired by canceling the audio sound inside the vehicle cabin of the own vehicle from the in-cabin sound data.

Subsequently to step S205, whether or not there is an instruction to end the recording operation is determined (step S206). When there is an instruction to end the recording operation in step S206 (in the case of YES), the recording operation is ended. When there is no instruction to end the recording operation in step S206 (in the case of YES), the processing is returned to step S201.

As described above, when a sound volume of an audio sound is greater than a predetermined sound volume, the recording device for vehicles according to the present embodiment composes sound data in event recording data with in-cabin sound data and in-cabin sound cancellation data acquired by canceling the audio sound inside the vehicle cabin. Consequently, clear sound data that may contribute to investigation of a cause of an accident can be recorded in event recording data, regardless of a sound volume of an audio sound played back in the own vehicle.

Third Embodiment

A configuration of an event data recorder 201 as a recording device for vehicles according to a third embodiment is the same as the configuration of the event data recorder 101 as the recording device for vehicles according to the second embodiment described with reference to FIG. 3.

Next, a flow of processing related to a recording operation of the event data recorder 201 will be described. In the following description, FIG. 3 is referred to as appropriate with regard to the configuration of the event data recorder 201. The event data recorder 101 is read as the event data recorder 201 in FIG. 3.

Figure 5:
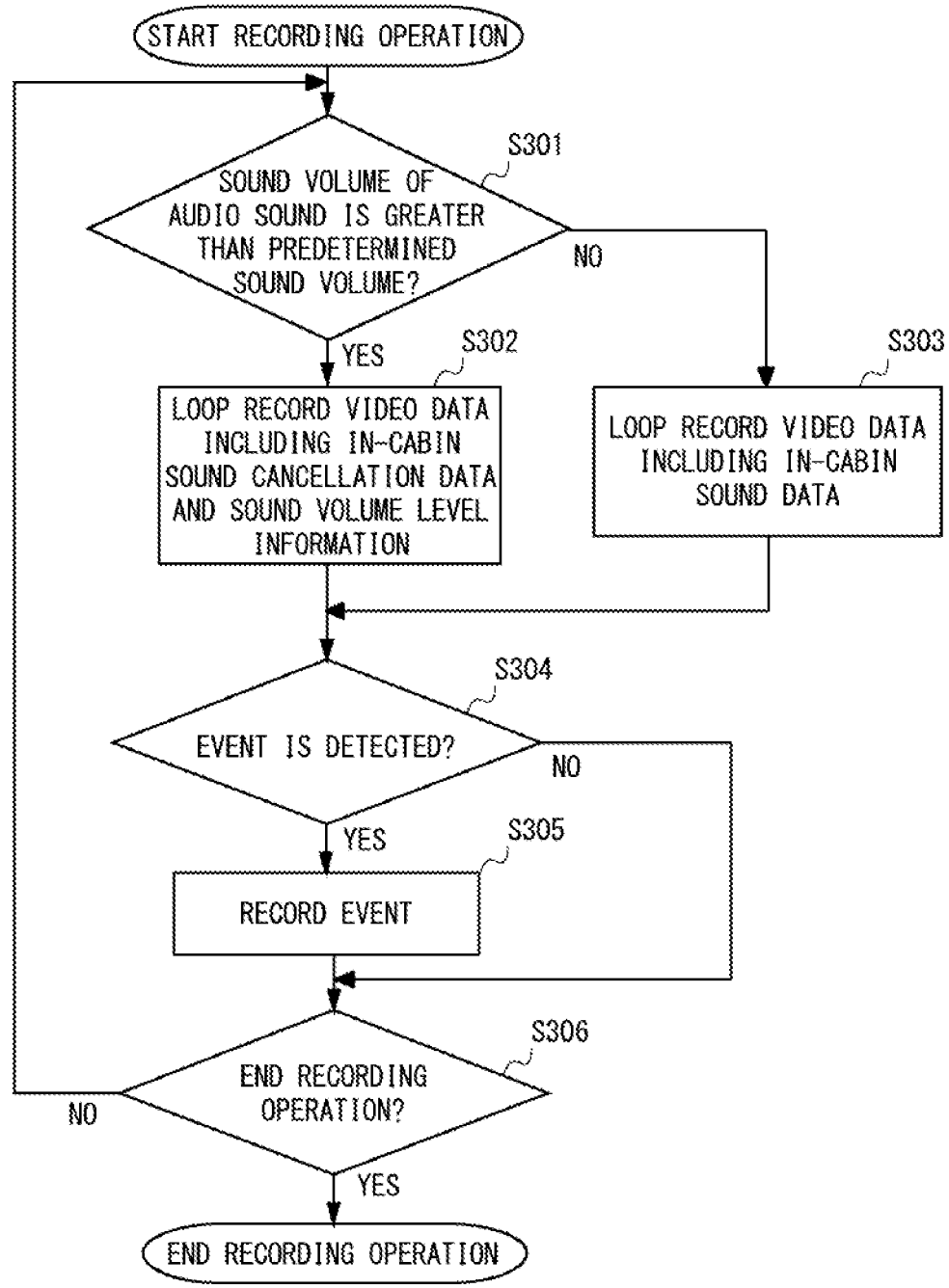
FIG. 5 is a flowchart illustrating an example of a flow of processing related to a recording operation of an event data recorder according to a third embodiment.

FIG. 5 is a flowchart illustrating an example of the flow of the processing related to the recording operation of the event data recorder 201 according to the third embodiment. The flow of the processing related to the recording operation of the event data recorder 201 according to the third embodiment differs from the flow of the processing related to the recording operation of the event data recorder 101 according to the second embodiment illustrated in FIG. 4 only in processing in step S302. In other words, processing in step S301 and step S303 to step S306 in FIG. 5 is the same as the processing in step S201 and step S203 to step S206 in FIG. 4, respectively. Accordingly, only the processing in step S302 will be described.

As illustrated in FIG. 5, when a sound volume of an audio sound is greater than a predetermined sound volume in step S301 (in the case of YES), the recording control unit 134 loop records video data including in-cabin sound cancellation data and sound volume level information into the recording unit 25 (step S302).

Specifically, the recording control unit 134 in the control unit 130 acquires sound volume level information from the sound volume detection unit 132 as data by which the sound volume of the audio sound can be determined. Then, the recording control unit 134 records video data including the sound volume level information as data by which the sound volume of the audio sound can be determined and the in-cabin sound cancellation data as sound data on which an effect of the audio sound is small into the recording unit 25.

The sound volume level information is a numerical value indicating a sound volume level or the like. Further, the in-cabin sound cancellation data are sound data acquired by canceling the audio sound inside the vehicle cabin in the own vehicle from the in-cabin sound data, as described above. When event recording data are played back, a sound volume level of an audio sound is displayed in a numerical value, a graph, or the like on a screen on a playback device such as the display unit 26, along with video data including sound data undergoing the cancellation processing. Consequently, analysis of an accident is more readily performed.

The present invention is not limited to the aforementioned embodiments and may be changed as appropriate without departing from the spirit of the present invention. For example, data by which a sound volume of an audio sound can be determined may be recorded as a combination of a plurality of the aforementioned types of data, and sound data on which an effect of an audio sound is small may be recorded as a combination of a plurality of the aforementioned types of sound data.

The processing in each unit in the recording device for vehicles according to the present invention may be provided by causing a computer or the like to execute a program. More specifically, the processing is provided by loading a program stored in a program memory into a main storage and executing the program by CPU control, in the recording device for vehicles. The program may be stored by use of various types of non-transitory computer readable media and supplied to the computer. The non-transitory computer readable media include various types of tangible storage media. Examples of the non-transitory computer readable media include magnetic recording media (for example, a flexible disk, a magnetic tape, and a hard disk drive), magneto-optical recording media (for example, a magneto-optical disk), a CD-read only memory (ROM), a CD-R, a CD-R/W, and semiconductor memories (for example, a mask ROM, a programmable ROM [PROM], an erasable PROM [EPROM], a flash ROM, and a random access memory [RAM]). Further, a program may be supplied to the computer by various types of transitory computer readable media. Examples of the transitory computer readable media include an electric signal, an optical signal, and an electromagnetic wave. A transitory computer readable medium can supply a program to a computer through wired communication channels such as an electric cable and an optical fiber, or wireless communication channels. Further, the processing in each unit in the recording device for vehicles is not limited to be provided by software through a program and may be provided by any combination of hardware, firmware, and software, or the like.

The present invention may be used as a recording device for vehicles for recording video data shot in a vehicle.

What is claimed is:

1. A recording device for vehicles comprising:
    a video data acquirer configured to acquire video data including sound data and imaging an area around an own vehicle;
    a sound volume detector configured to detect a sound volume of an audio sound played back in the own vehicle; and
    a recording controller configured to record video data including data by which a sound volume of an audio sound can be determined and sound data on which an effect of an audio sound is small, when a sound volume of an audio sound detected by the sound volume detector is greater than a predetermined sound volume, and configured to record video data including sound data inside a vehicle cabin of the own vehicle when the sound volume of the audio sound detected by the sound volume detector is equal to or smaller than the predetermined sound volume.

2. The recording device for vehicles according to claim 1, further comprising an event detector configured to detect occurrence of a predetermined event with respect to the own vehicle,
   wherein, when the event detector detects an event, the recording controller records, as event recording data, video data including data by which a sound volume of an audio sound can be determined and sound data on which an effect of an audio sound is small, when a sound volume of an audio sound detected by the sound volume detector is greater than a predetermined sound volume in a predetermined period including at least a time of occurrence of an event.

3. The recording device for vehicles according to claim 1, wherein the recording controller records video data including the sound data inside the vehicle cabin of the own vehicle as data by which a sound volume of an audio sound can be determined and sound data outside the vehicle cabin of the own vehicle as sound data on which an effect of an audio sound is small.

4. The recording device for vehicles according to claim 1, further comprising a cancellation processor configured to cancel an audio sound from sound data acquired inside the vehicle cabin of the own vehicle, on a basis of an audio signal acquired from an audio device outputting an audio sound,
   wherein the recording controller records video data including the sound data inside the vehicle cabin of the own vehicle as data by which a sound volume of an audio sound can be determined and sound data acquired by canceling an audio sound inside the vehicle cabin of the own vehicle as sound data on which an effect of an audio sound is small.

5. The recording device for vehicles according to claim 1, further comprising a cancellation processor configured to cancel an audio sound from sound data acquired inside the vehicle cabin of the own vehicle, on a basis of an audio signal acquired from an audio device outputting an audio sound,
   wherein the recording controller records video data including sound volume level information acquired from the sound volume detector as data by which a sound volume of an audio sound can be determined and sound data acquired by canceling an audio sound inside the vehicle cabin of the own vehicle as sound data on which an effect of an audio sound is small.

6. The recording device for vehicles according to claim 1, wherein the recording controller is configured to record video data that does not include the sound data on which the effect of the audio sound is small when the sound volume of the audio sound detected by the sound volume detector is equal to or smaller than the predetermined sound volume.

7. A recording method for vehicles, the recording method comprising:
   a first step of acquiring video data including sound data and imaging an area around an own vehicle;
   a second step of detecting a sound volume of an audio sound played back in the own vehicle; and
   a third step of recording video data including data by which a sound volume of an audio sound can be determined and sound data on which an effect of an audio sound is small, when a detected sound volume of an audio sound is greater than a predetermined sound volume and recording video data including sound data inside a vehicle cabin of the own vehicle when the sound volume of the audio sound detected by a sound volume detector is equal to or smaller than the predetermined sound volume.

8. A non-transitory computer readable medium storing recording control program for vehicles causing a computer to perform:
   a first processing procedure of acquiring video data including sound data and imaging an area around an own vehicle;
   a second processing procedure of detecting a sound volume of an audio sound played back in the own vehicle; and
   a third processing procedure of recording video data including data by which a sound volume of an audio sound can be determined and sound data on which an effect of an audio sound is small, when a detected sound volume of an audio sound is greater than a predetermined sound volume and recording video data including sound data inside a vehicle cabin of the own vehicle when the sound volume of the audio sound detected by a sound volume detector is equal to or smaller than the predetermined sound volume.

* * * * *